(12) United States Patent
Zhou et al.

(10) Patent No.: US 9,507,613 B2
(45) Date of Patent: Nov. 29, 2016

(54) METHODS AND APPARATUS FOR DYNAMICALLY PRELOADING CLASSES

(75) Inventors: Jiangli Zhou, San Ramon, CA (US); Christopher Jordan Plummer, San Martin, CA (US); Dean Roy Ernest Long, Chula Vista, CA (US)

(73) Assignee: Oracle International Corporation, Redwood City, CA (US)

( * ) Notice: Subject to any disclaimer, the term of this patent is extended or adjusted under 35 U.S.C. 154(b) by 740 days.

(21) Appl. No.: 13/436,476

(22) Filed: Mar. 30, 2012

(65) Prior Publication Data

US 2013/0263123 A1 Oct. 3, 2013

(51) Int. Cl.
  *G06F 9/44* (2006.01)
  *G06F 9/455* (2006.01)
  *G06F 9/445* (2006.01)

(52) U.S. Cl.
  CPC ........... *G06F 9/45504* (2013.01); *G06F 9/445* (2013.01)

(58) Field of Classification Search
  None
  See application file for complete search history.

(56) References Cited

U.S. PATENT DOCUMENTS

| | | | | |
|---|---|---|---|---|
| 5,815,718 A * | 9/1998 | Tock | ...................... | G06F 9/443 712/E9.084 |
| 5,966,542 A | 10/1999 | Tock | | |
| 6,223,346 B1 * | 4/2001 | Tock | ...................... | G06F 9/443 712/E9.084 |
| 6,470,494 B1 * | 10/2002 | Chan | ...................... | G06F 9/445 717/139 |
| 6,571,388 B1 * | 5/2003 | Venkatraman | ...... | G06F 9/44557 717/108 |
| 6,658,492 B1 * | 12/2003 | Kawahara | ........... | G06F 9/44573 717/159 |
| 6,745,386 B1 * | 6/2004 | Yellin | ................. | G06F 9/44521 717/139 |
| 6,813,762 B1 * | 11/2004 | Plaxton | ............... | G06F 9/44557 717/139 |
| 6,826,559 B1 * | 11/2004 | Ponte | ................. | G06F 17/30867 |
| 6,996,813 B1 * | 2/2006 | Sokolov | .............. | G06F 9/44521 717/139 |

(Continued)

OTHER PUBLICATIONS

"Dalvik Bytecode Verifier Notes," 2008 The Android Open Source Project, downloaded from http://www.netmite.com/android/mydroid/dalvik/docs/verifier.html on Feb. 22, 2012, 2 pages.

(Continued)

*Primary Examiner* — Emerson Puente
*Assistant Examiner* — Mehran Kamran
(74) *Attorney, Agent, or Firm* — Robert C. Kowert; Meyertons, Hood, Kivlin, Kowert & Goetzel, P.C.

(57) ABSTRACT

A class preloading mechanism that dynamically preloads classes at runtime in a virtual machine (VM) environment. Data structures representing preloaded classes may be stored in a persistent module corresponding to a classloader. A persistent module can be directly mapped or copied into a memory region at runtime so that the classes may not have to be loaded from the class file container. The preloaded classes are not fully linked and resolved. When a classloader receives a class request, the classloader looks up the preloaded class in the memory region and completes linking and resolution of the class. Persistent modules may be pre-generated and, for example, installed with an application. Alternatively, a persistent module for a class file container may be generated at runtime by preloading classes from the class file container into a memory region and storing data structures representing the classes as a persistent module.

20 Claims, 9 Drawing Sheets

(56) References Cited

U.S. PATENT DOCUMENTS

| | | | | |
|---|---|---|---|---|
| 7,159,213 B2* | 1/2007 | Tock | ............... | G06F 9/443 712/E9.084 |
| 7,318,229 B1* | 1/2008 | Connor | ............... | G06F 9/443 714/25 |
| 7,426,720 B1* | 9/2008 | Fresko | ............... | G06F 9/44563 717/140 |
| 7,467,137 B1* | 12/2008 | Wolfe | ............... | G06F 17/30306 |
| 7,512,664 B1* | 3/2009 | Brewer | ............... | G06F 9/445 709/217 |
| 7,882,198 B2* | 2/2011 | Landau | ............... | G06F 9/44563 709/214 |
| 8,489,872 B1* | 7/2013 | Kapoor | ............... | G06F 9/4443 709/227 |
| 2001/0047513 A1* | 11/2001 | Tock | ............... | G06F 9/443 717/162 |
| 2002/0138667 A1* | 9/2002 | Sokolov | ............... | G06F 9/445 719/331 |
| 2003/0070161 A1* | 4/2003 | Wong | ............... | G06F 8/443 717/148 |
| 2004/0015935 A1* | 1/2004 | Sokolov | ............... | G06F 9/445 717/166 |
| 2004/0153996 A1* | 8/2004 | Boykin | ............... | G06F 9/445 717/118 |
| 2004/0261069 A1* | 12/2004 | Verbeke | ............... | G06F 9/44521 717/166 |
| 2005/0246695 A1* | 11/2005 | Wang | ............... | G06F 9/45516 717/148 |
| 2006/0041880 A1* | 2/2006 | Martin | ............... | G06F 9/445 717/166 |
| 2006/0136401 A1* | 6/2006 | Normington | ............... | G06F 9/44521 |
| 2006/0225059 A1* | 10/2006 | Plaxton | ............... | G06F 9/445 717/148 |
| 2007/0255751 A1* | 11/2007 | Bansal | ............... | G06F 8/10 |
| 2008/0066089 A1* | 3/2008 | Kamiya | ............... | G06F 9/468 719/328 |
| 2008/0127141 A1* | 5/2008 | Fulton | ............... | G06F 9/44521 717/148 |
| 2009/0106747 A1* | 4/2009 | Arcese | ............... | G06F 9/445 717/166 |
| 2010/0023702 A1* | 1/2010 | Landau | ............... | G06F 9/44563 711/147 |
| 2010/0199259 A1* | 8/2010 | Quinn | ............... | G06F 9/44536 717/106 |
| 2011/0197183 A1* | 8/2011 | Wang | ............... | G06F 9/45504 717/166 |
| 2011/0296375 A1* | 12/2011 | Mooney | ............... | G06F 8/423 717/106 |
| 2012/0005663 A1* | 1/2012 | Burckart | ............... | G06F 9/445 717/166 |
| 2012/0159466 A1* | 6/2012 | Burckart | ............... | G06F 9/445 717/166 |
| 2012/0191922 A1* | 7/2012 | Monnie | ............... | G06F 9/526 711/150 |
| 2012/0331445 A1* | 12/2012 | Centonze | ............... | G06F 8/443 717/110 |
| 2013/0007713 A1* | 1/2013 | Arcese | ............... | G06F 8/315 717/124 |

OTHER PUBLICATIONS

".dex—Dalvik Executable Format," 2007 The Android Open Source Project, downloaded from http://www.netmite.com/android/mydroid/dalvik/docs/dex-format.html on Feb. 22, 2012, 26 pages.

"Dalvik Optimization and Verification With dexopt," 2008 The Android Open Source Project, downloaded from http://www.netmite.com/android/mydroid/dalvik/docs/dexopt.html on Feb. 22, 2012, 4 pages.

* cited by examiner

METHODS AND APPARATUS FOR DYNAMICALLY PRELOADING CLASSES

BACKGROUND

FIG. 1 illustrates a conventional classloading method in virtual machine (VM) environments, for example Java® Virtual Machine (JVM®) technology environments. As indicated at 100, a request to load a class is obtained by a classloader. As indicated at 102, the classloader may delegate classloading to a parent classloader, which may, but does not necessarily, load the class. As indicated at 104, if the class was not loaded via delegation, the classloader searches its class path (for example, specified as a URL) to find the requested class, as indicated at 106. Typically, the class will be specified as a class file in a class file container (e.g., a Java® Archive (JAR) file) specified by the class path. As indicated at 108, the classloader may perform security checks on the class/class file. As indicated at 110, the classloader then reads the class file (e.g., from the JAR file) and at least partially parses the class file to verify the class format. Note that element 110 may not be performed if verification is not needed or disabled. As indicated at 112, the classloader may then read and parse the class file in more detail to create VM internal metadata structures for the class. As indicated at 114, the classloader may then create the class instance. At 116, class linking is performed. Class linking may include linking the class to a superclass, generating a method table based partially on the superclass, and determining object layout based partially on the superclass. At 118, the class is made available in the VM environment. In some implementations, this may involve adding the class to a class table and the classloader's class vector.

In conventional classloading methods, constant pool resolution typically happens lazily (on demand) after the class is loaded and linked. During execution of a class, constant pool entries are resolved on first references.

However, the conventional classloading method tends to be relatively slow as it involves looking up and reading class files from class file containers, creating VM internal data structures for the class metadata, and so on. In addition, constant pool resolution tends to be slow, and needs to be performed each time a class is loaded. Classloading performance can thus have a significant negative performance impact on applications, especially at startup. On systems such as embedded systems or mobile devices that may have relatively limited processors and/or relatively slower I/O operations, the impact of classloading performance becomes even more significant.

Java and JVM are trademarks or registered trademarks of Oracle, Inc. and/or its affiliates in the United States and other countries.

SUMMARY

Embodiments of a dynamic class preloading method and mechanism are described that dynamically preload classes for an application in a virtual machine (VM) execution environment (e.g., from class files in class file containers such as Java Archive (JAR) files), specifically when a classloader corresponding to the class file containers(s) is instantiated. The classes may be preloaded from the class file container(s) (e.g., JAR files) into memory of the VM. In preloading the classes into memory from the class file containers, runtime data structures for the classes may be created; however, the preloaded classes are not fully linked and resolved. The preloaded class data in memory may then be stored in a persistent module or modules. When a classloader receives a request for a class during application execution, the classloader looks up the preloaded class data structures in memory and completes linking and resolution of the class to load the class. When the classloader is instantiated on subsequent executions of the application in the VM environment, if a persistent module corresponding to a class file container exists, then the persistent module can be mapped or copied into memory of the VM so that the classes do not have to be loaded from the class file container. Preloaded classes copied or mapped into memory from the persistent modules are not fully linked and resolved until the classes are actually loaded in response to requests for the classes during runtime.

In the class preloading method according to at least some embodiments, a classloader instance may be created. During or after instantiation of the classloader instance, the class path of the classloader (for example, specified as a URL) may be traversed to determine, for each of one or more class file containers associated with the classloader, if there is a persistent module corresponding to the class file container.

In at least some embodiments, for each class file container, if a corresponding persistent module for the class file container is not found, memory may be allocated for preloading the class file(s) from the class file container. In at least some embodiments, the memory for preloading the class file(s) from a given class file container may be allocated as a contiguous block of memory. However, in some embodiments, the memory is not necessarily allocated as a contiguous block. All of the classes from the class file container may then be preloaded into the memory allocated for the class file container. The memory allocated for preloading classes from a class file container may be referred to herein as a memory region. Each class file container that is preloaded may be preloaded into a separate memory region (which may be, but is not necessarily, a contiguous block of memory) that is allocated for that class file container. In preloading the class(es) from a class file container into memory, runtime data structures for the classes may be created and static security checks may be performed, but the classes are not fully linked and resolved. After the classes from the class file container have been preloaded into memory, the memory region corresponding to the class file container may be written to a persistent module. However, if a corresponding persistent module for a class file container is found, then the persistent module may be copied or mapped into a memory region for the class file container. Classes copied or mapped into the memory region from the persistent modules are not fully linked and resolved.

After a memory region corresponding to each of the one or more class file containers associated with the classloader has been created either by preloading from a class file container or by copying or mapping from a persistent module, classes may be loaded by the classloader instance from the memory region in response to requests for the classes received by the classloader instance during runtime of the application. The classloader instance may perform a lookup operation to locate the class data in the memory region. The classloader instance may then perform dynamic (runtime) security checks on the class data. In at least some embodiments, static security checks performed during preloading are not repeated. After performing the dynamic security checks, any necessary post-processing of the class data may be performed. The class may be linked to a superclass. In at least some embodiments, the class may then be added to the class table and the classloader's class vector. The application can then use the fully loaded class.

In addition or as an alternative to class preloading methods and mechanisms in which persistent modules are generated for class file containers at runtime of an application in a VM environment, embodiments are described in which at least some persistent modules for an application may be pre-generated. For example, an external application or utility may be provided that reads class file containers (e.g., JAR files) associated with classloaders and generates persistent modules that correspond to the class file containers. The pre-generated persistent module(s) for an application may, for example, be installed with the application on a device.

Figure 1:
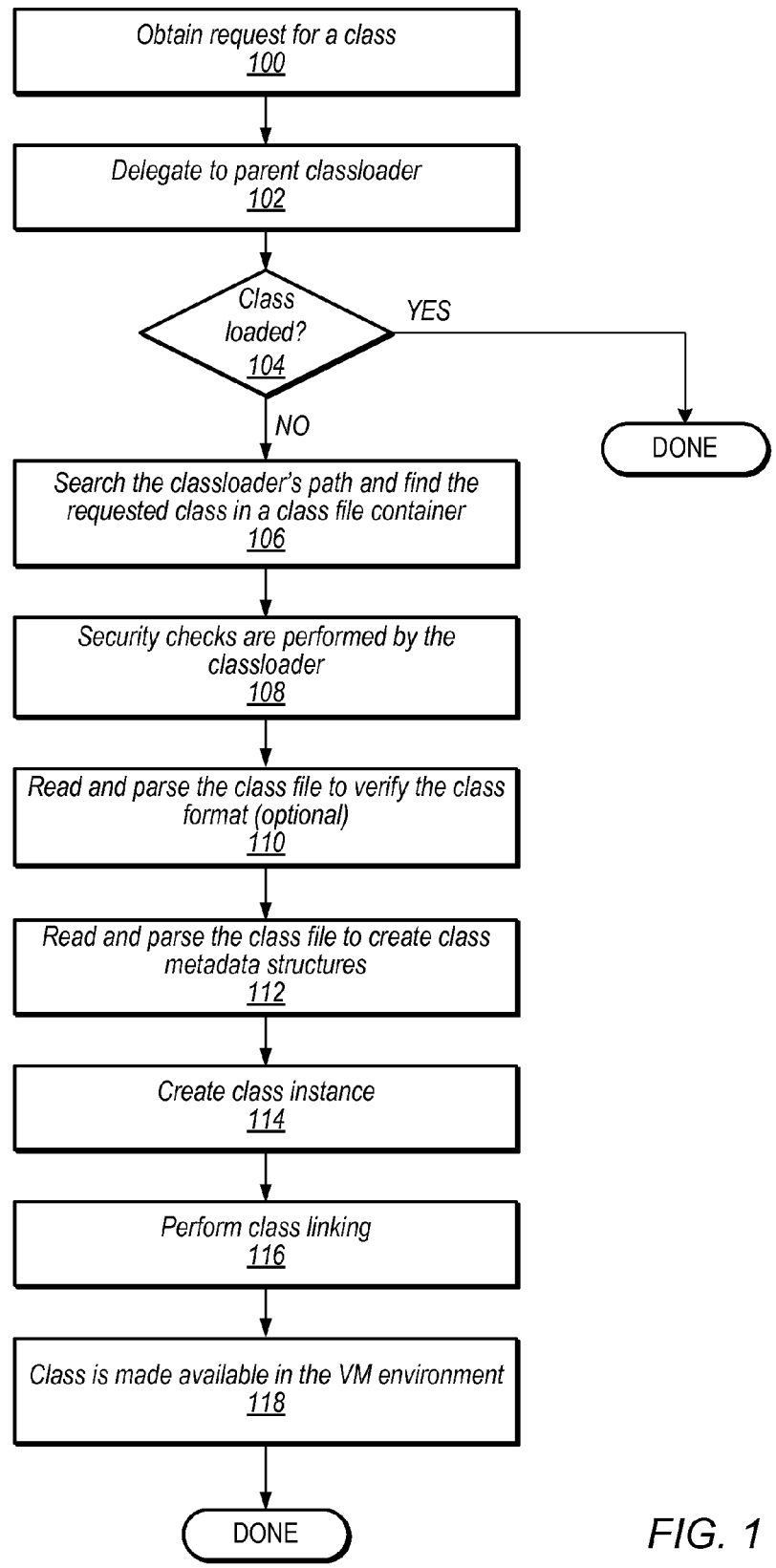
FIG. 1 illustrates a conventional classloading method in virtual machine (VM) environments.

While the system is described herein by way of example for several embodiments and illustrative drawings, those skilled in the art will recognize that the system is not limited to the embodiments or drawings described. It should be understood, that the drawings and detailed description thereto are not intended to limit the system to the particular form disclosed but on the contrary, the intention is to cover all modifications, equivalents and alternatives falling within the spirit and scope of the present system as defined by the appended claims. The headings used herein are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words, "include", "including", and "includes" mean including, but not limiting to.

DETAILED DESCRIPTION OF THE EMBODIMENTS

Embodiments of methods and apparatus for dynamically preloading classes are described that may reduce the time it takes to load classes. Embodiments of a class preloading method and mechanism are described that dynamically preload classes for an application at runtime in a virtual machine (VM) execution environment, for example a Java® Virtual Machine (JVM®) technology environment. The classes may be preloaded from class files in class file containers, for example Java Archive (JAR) file(s), specifically when a classloader corresponding to the class file container(s) is instantiated. The classes may be preloaded from the class file container(s) into memory of the VM. In preloading the classes into memory from the class file container(s), runtime data structures for the classes may be created; however, the classes are not fully linked and resolved. The preloaded class data in memory may then be stored in a persistent module or modules. When a classloader receives a request for a class during application execution, the classloader looks up the preloaded class data structures in memory and completes linking and resolution of the class to load the class. When the classloader is instantiated on subsequent executions of the application in the VM environment, if a persistent module corresponding to a class file container exists, then the persistent module can be copied or mapped into memory of the VM so that the classes do not have to be loaded from the class file container. Preloaded classes copied or mapped into memory from the persistent modules are not fully linked and resolved until the classes are actually loaded in response to requests for the classes during runtime.

In addition or as an alternative to class preloading methods and mechanisms as described above in which persistent modules are generated for class file containers at runtime of an application in a VM environment, at least some persistent modules for an application may be pre-generated. For example, an external application or utility may be provided that reads class file containers (e.g., JAR files) associated with classloaders and generates, as output, persistent modules that correspond to the class file containers. The pre-generated persistent module(s) for an application may, for example, be installed with the application on a device.

Embodiments of the class preloading method may dynamically preload classes for an application at runtime in a VM environment rather than at build time, which allows the VM to preload classes that it was not even aware of when the VM was built. In contrast, conventional preloading methods typically perform preloading only at build time.

At least some embodiments of the class preloading method may, but do not necessarily, generate persistent modules from class file containers (e.g., JAR files) at runtime of an application in the VM environment. In at least some embodiments, if a persistent module corresponding to a class file container is not found at runtime, the classloader preloads classes from the class file container into memory; the preloaded classes may subsequently be stored as a persistent module in a location that can be accessed on subsequent executions according to the class path of the classloader. In contrast, conventional preloading methods typically generate persistent versions of preloaded classes only at build time.

Embodiments of the class preloading method may create runtime data structures that represent class metadata in memory of the VM when preloading classes from a class file container or from a persistent module.

However, as previously noted, the classes preloaded from a class file container or loaded from a persistent module into memory of the VM are not fully linked and resolved. Embodiments of the class preloading method may defer at least some class linking and resolution tasks until the class is loaded from the preloaded class in memory in response to a request for a class. For example, in at least some embodiments, one or more of locating super interfaces, linking the class to a superclass, generating a method table based partially on the superclass, and determining object layout based partially on the superclass may only be performed when the class is loaded from the preloaded class in memory.

Embodiments of the class preloading method do not assume a classloader hierarchy. Thus, the persistent modules, each corresponding to a particular classloader, are not hierarchical and do not depend on each other; a change in one persistent module does not invalidate any other persistent modules.

Embodiments of the class preloading method may allow direct pointers or references between data structures within a persistent module, and may also allow indirect references based on offsets, e.g. offsets from the beginning of the persistent module or from some other known location in the persistent module. In contrast, at least some conventional preloading methods only allow indirect references within a persistent version of preloaded classes based on offsets.

Embodiments of the class preloading method may tokenize name and/or type strings, for example when preloading classes into memory from class file containers or persistent modules. The tokenized strings (referred to herein as type identifiers, or type IDs) may be stored to a global type ID database so that conflicts between persistent modules may be avoided. The global type ID database may be persistently stored.

Figure 2A:
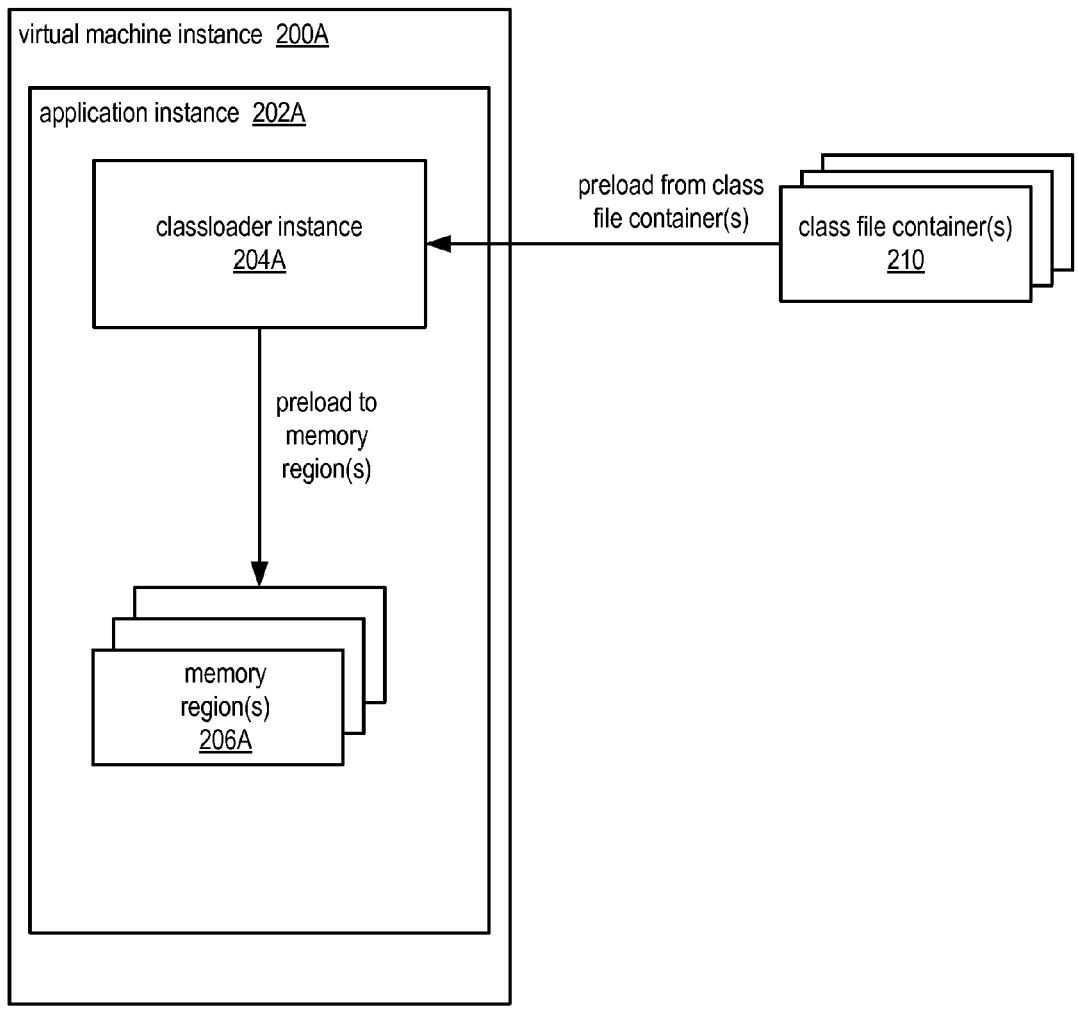
FIG. 2A illustrates operations of the class preloading method and mechanism in which classes are preloaded from class file containers files into memory regions, according to at least some embodiments.

FIGS. 2A through 2D are block diagrams illustrating the class preloading method and mechanism in a virtual machine environment, according to at least some embodiments. FIG. 2A illustrates operations of the class preloading method and mechanism in which classes are preloaded from class file containers (e.g., JAR files) into memory regions, according to at least some embodiments. For example, classes may be preloaded from class file containers into memory of a virtual machine (VM) instance upon an initial execution of the application, or upon subsequent executions if a class file container has been modified or replaced and/or a corresponding persistent module for a class file container has been deleted or cannot be found for some other reason.

Figure 6:
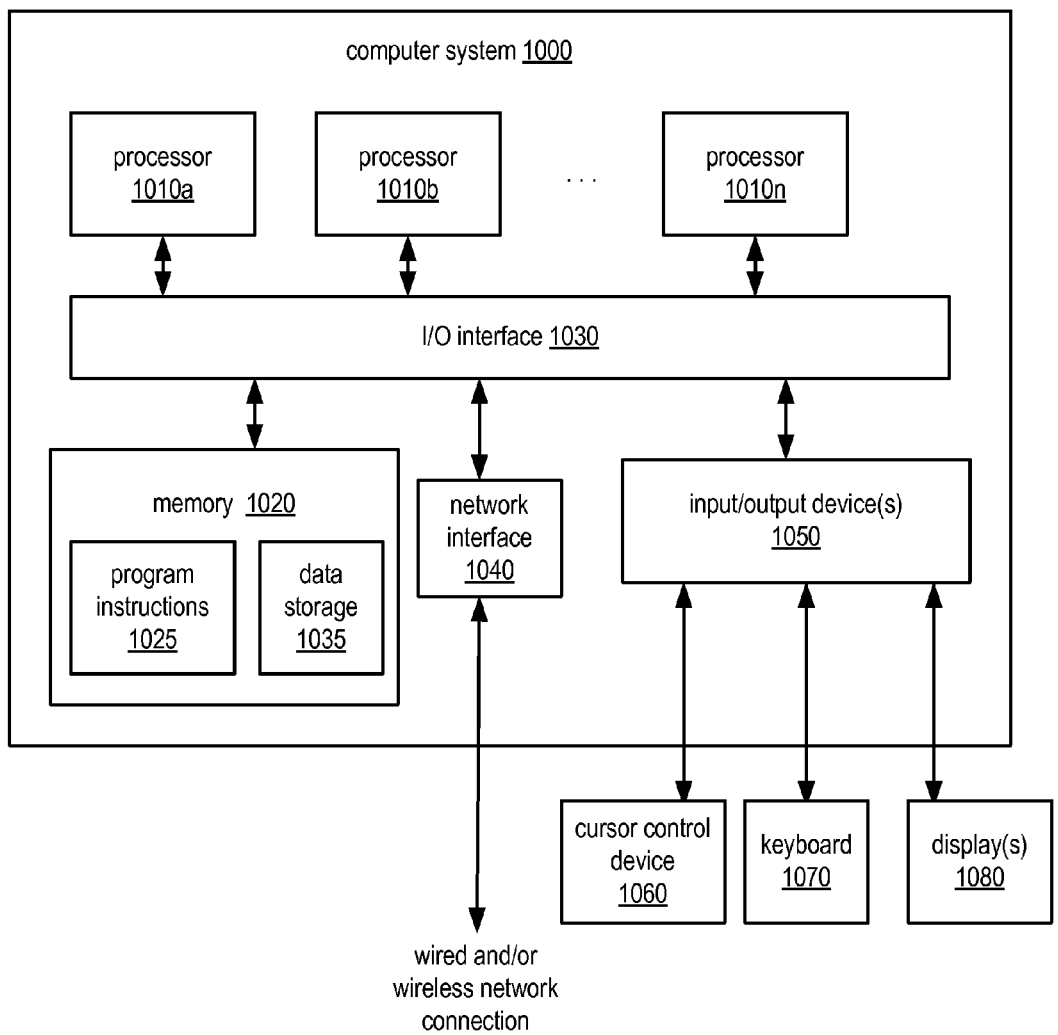
FIG. 6 is a block diagram of a computing device, according to some embodiments.

A virtual machine (VM) technology (e.g., the Java Virtual Machine (JVM) technology) may be instantiated as a virtual machine (VM) instance 200A on a device. The device may, for example, be a mobile and/or embedded device including but not limited to a mobile/cell phone, smart phone, tablet or pad device, Personal Digital Assistant (PDA), camera, control device, set-top box, game console, home appliance, and so on. However, the device may be a notebook or laptop computer, a desktop computer, server, or any other computing device. FIG. 6 illustrates an example device on which the VM environment may be implemented.

An application may be instantiated as an application instance 202A on the VM instance 200A. The application instance 202A may be, but is not necessarily, an initial instantiation of the application on the device. During startup of the application instance 202A, or after startup and during runtime of the application instance 202A, a classloader for the application may be instantiated as classloader instance 204A. The classloader may, for example, be a system classloader instantiated at startup of the application instance 202A, a middleware classloader, application classloader, or in general any classloader instantiated at startup or during runtime of the application instance 202A.

During or after instantiation of the classloader instance 204A, the class path of the classloader (for example, specified as a URL) may be traversed to determine, for each of one or more class file containers 210 (e.g., JAR files) associated with the classloader, if there is a persistent module corresponding to the class file container 210. Note that class file container(s) 210 may be locally stored on and accessed from the same device as the virtual machine instance 200 and/or may be remotely stored on some other device or devices and remotely accessed via a wired or wireless network. Upon determining that there is not a persistent module corresponding to a class file container 210, all of the classes from the class file container 210 may be preloaded into memory of the VM. In at least some embodiments, memory may be allocated for preloading the class file(s) from the class file container 210. In at least some embodiments, the memory for preloading the class file(s) from a given class file container 210 may be allocated as a contiguous block of memory. However, in some embodiments, the memory is not necessarily allocated as a contiguous block. The memory into which classes from a class file container 210 are preloaded may be referred to herein as a memory region, shown as memory region(s) 206A in FIG. 2A. In at least some embodiments, each class file container that is preloaded may be preloaded into a separate memory region 206A (which may be, but is not necessarily, a contiguous block of memory) that is allocated for that class file container. All of the classes from the class file container 210 may then be preloaded into a corresponding memory region 206A. In at least some embodiments, a memory region 206A may be expanded by allocating additional memory if necessary.

In at least some embodiments, the class data from class file container(s) 210 are mapped into virtual memory; class data from memory region(s) 206A are not placed into physical memory (e.g., random access memory (RAM)) until page(s) are accessed. In at least some embodiments, as an alternative to mapping the class data into virtual memory and loading the pages on demand when accessed, the class data may be preloaded or copied directly into memory (e.g., directly into RAM).

In at least some embodiments, to preload the classes from a class file container 210, static security checks may be performed on the classes. For example, class names and/or package names may be checked to determine if the names are in a valid format and include only valid characters. The class file(s) in the class file container 210 may be parsed and the format of the class(es) in the class file(s) may be verified. Runtime data structures and class data for the class(es) may be created in the corresponding memory region 206A.

Figure 2B:
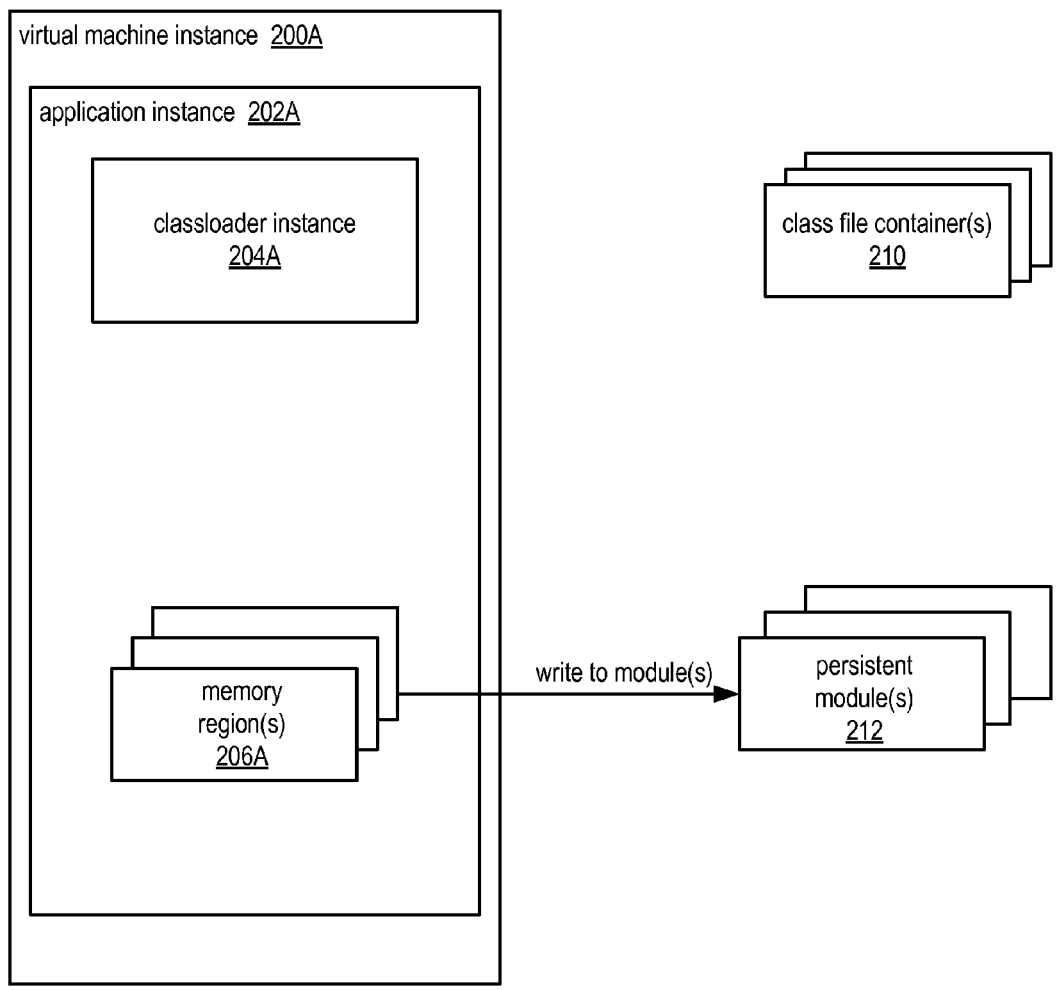
FIG. 2B illustrates writing the preloaded memory region(s) for class file container(s) to persistent module(s), according to at least some embodiments.

After the class file container(s) 210 have been preloaded into the memory region(s) 206A, the memory region(s) 206A may be written to persistent module(s) 212 as shown in FIG. 2B. In at least some embodiments, each persistent module 212 may be a memory mapped file. Persistent module(s) may be locally stored on the same device as the virtual machine instance 200 or may be remotely stored on some other device or devices.

In at least some embodiments, a separate memory region 206A is allocated for each class file container 210, and a separate persistent module 212 is created for each memory region 206A. Thus, there may be a one-to-one relationship between class file containers 210 and persistent modules 212 for a classloader, with each persistent module 212 corresponding to only one class file container 210, and vice versa.

Figure 2C:
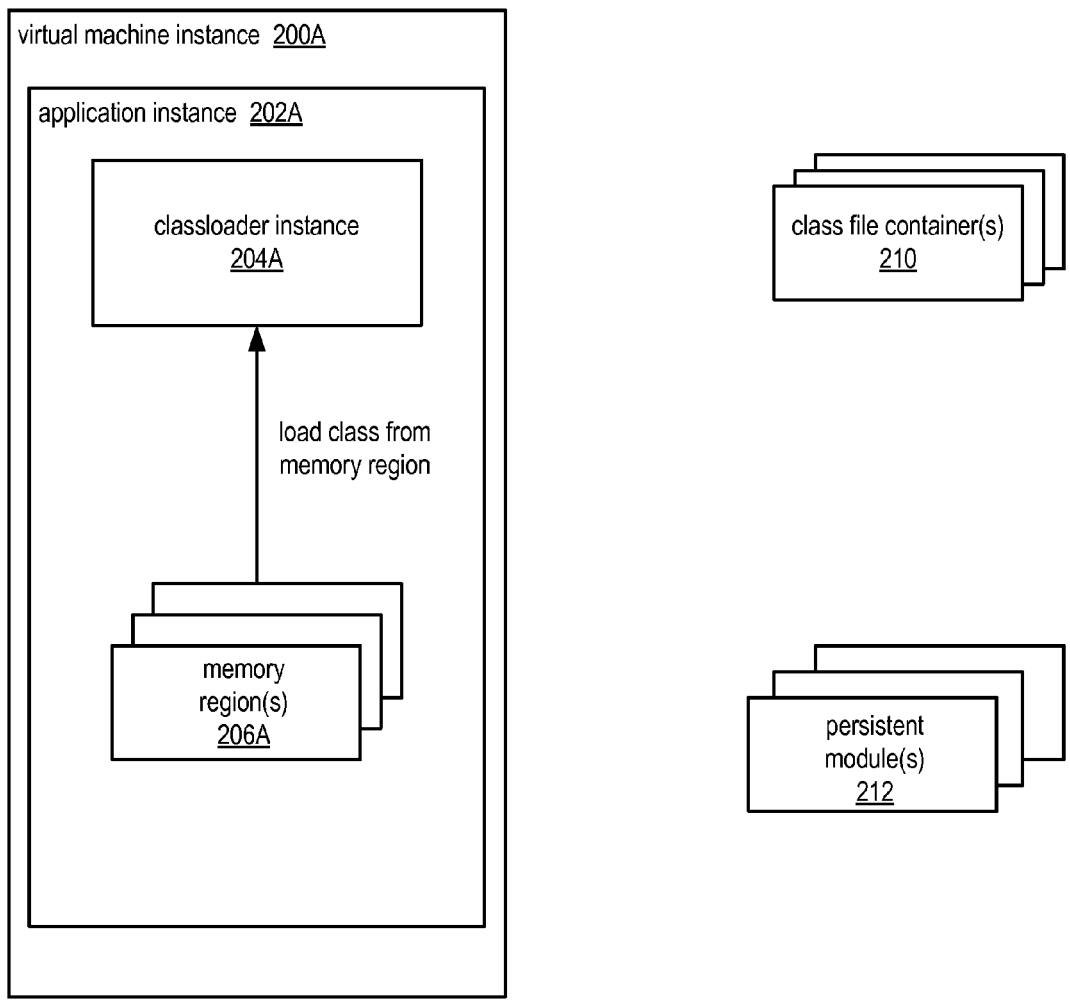
FIG. 2C illustrates loading a class from the preloaded memory region(s) during runtime, according to at least some embodiments.

FIG. 2C illustrates loading a class from the preloaded memory region(s) during runtime, according to at least some embodiments. As shown in FIG. 2C, after the class file container(s) 210 have been preloaded into the memory region(s) 206A, classes may be loaded by the classloader instance 204A from the memory region(s) 206A in response to requests for the classes received by the classloader instance 204A during runtime of the application 202. Note that the classloader instance 204A may first delegate loading of the class to a parent classloader and may only attempt to load the class from a memory region 206A if delegation does not result in the class being loaded, and thus classloading responsibilities are passed back to the classloader instance 204A. In at least some embodiments, to load a class from a memory region 206A, the classloader instance 204A may perform a lookup operation to locate the class data in a memory region 206A. The classloader instance 204A may then perform dynamic (runtime) security checks on the class data. For example, security checks performed by a security manager may be performed during the actual loading of the class illustrated in FIG. 2C, as opposed to the preloading illustrated in FIG. 2A. In at least some embodiments, static security checks performed during preloading are not repeated. After performing the dynamic security checks, any necessary post-processing of the class data may be performed. Class linking may be performed. In at least some embodiments, class linking may include, but is not limited to, locating super interfaces, linking the class to a superclass, generating a method table based partially on the superclass, and determining object layout based partially on the superclass. The class may then be made available in the VM environment for use by application(s). The application can then use the fully loaded class. In at least some embodiments, in making the class available, the class may be added to the class table and the classloader's class vector. The application 202A can then use the fully loaded class.

Figure 2D:
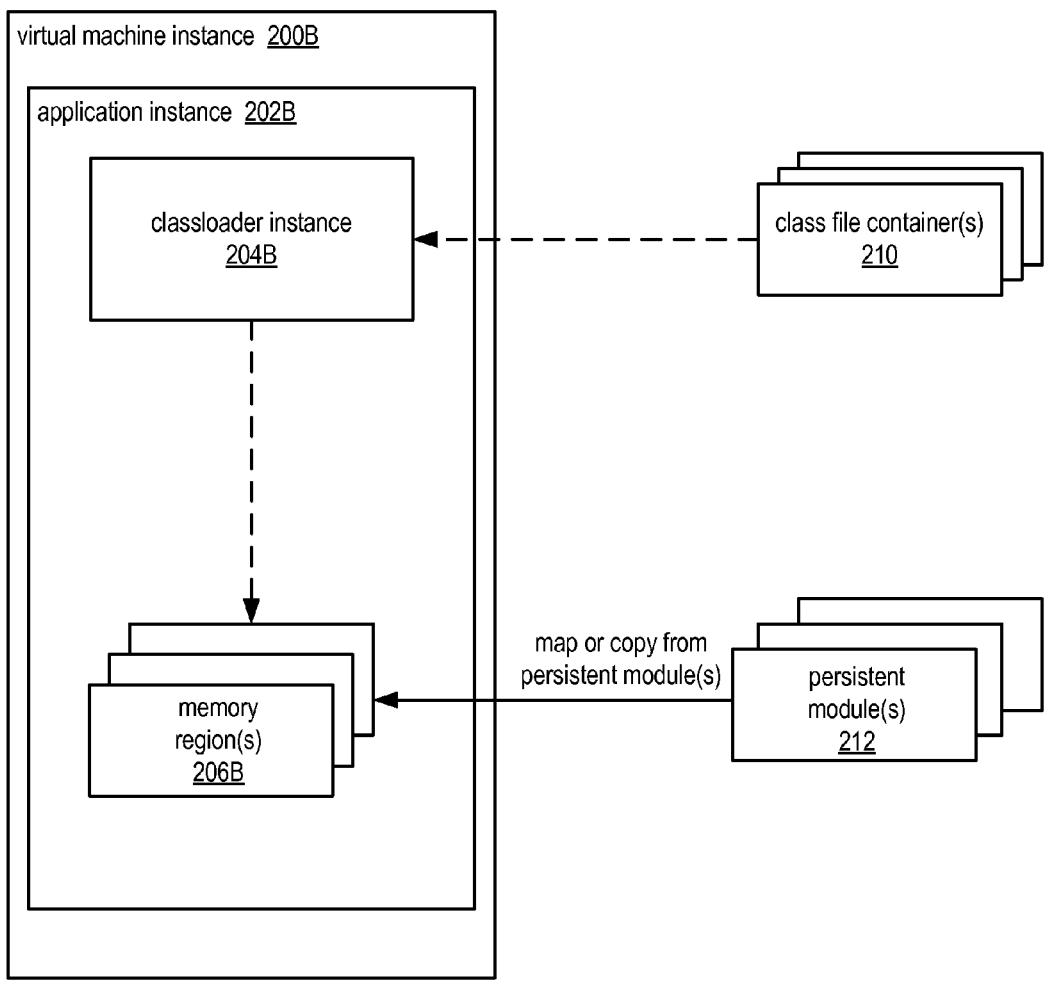
FIG. 2D illustrates operations of the class preloading method and mechanism on subsequent executions of the application, according to at least some embodiments.

FIG. 2D illustrates operations of the class preloading method and mechanism on subsequent executions of the application, according to at least some embodiments. For example, in FIG. 2D, classes may have been preloaded from class file container(s) 210 upon previous execution(s) of the application on the device, and persistent modules 212 corresponding to the class file container(s) 210 may have been created in those previous execution(s).

In FIG. 2D, VM technology (e.g., JVM technology) may be instantiated as VM instance 200B on the same device as in FIGS. 2A through 2C. The application may be instantiated as an application instance 202B on the VM instance 200B. During startup of the application instance 202B, or after startup and during runtime of the application instance 202B, a classloader for the application may be instantiated as classloader instance 204B. During or after instantiation of the classloader instance 204B, for each of one or more class file containers 210 associated with the classloader, the class path of the classloader (for example, specified as a URL) may be traversed to determine if there is a persistent module 212 corresponding to the class file container 210. In FIG. 2D, the persistent module(s) 212 exist, having been created on a previous execution of the application, and are found. Thus, instead of preloading the classes from the class file containers 210, the persistent module(s) 212 may be copied or mapped into memory region(s) 206B. In at least some embodiments, each persistent module 212 may be copied or mapped into the same address range as the memory region 206A from which it was originally created. Thus, memory addressed of all class data structures may remain consistent between executions of the application. However, at least some embodiments may allow a persistent module 212 to be copied or mapped into any address range. In these embodiments, the persistent module 212 may include relocation information so that any direct references to the data structures within the persistent module 212 can be mapped to the proper addresses in the respective memory region 206B.

In at least some embodiments, the persistent module(s) 212 are mapped into virtual memory; class data from memory region(s) 206B are not placed into physical memory until page(s) are accessed. In at least some embodiments, as an alternative to mapping the persistent module(s) 212 into virtual memory and loading the pages on demand when accessed, the persistent module(s) 212 may be loaded or copied directly into memory.

In at least some embodiments, after the persistent module(s) 212 are mapped or copied into memory region(s) 206B, code source and protection domain instances for the specific class path(s) may be created.

After the persistent module(s) 212 are copied or mapped into memory region(s) 206B, classes can be loaded from memory region(s) 206B in the same manner as shown for class loading from memory region(s) 206A in FIG. 2C.

As shown by the dashed lines in FIG. 2D, it is possible that classloader instance 202B may not find a persistent module 212 corresponding to a class file container 210 on a subsequent execution of the application. For example, a class file container 210 may be modified or replaced, and the application manager may delete the corresponding persistent module 212. In this case, the class file container 210 may be preloaded into a memory region as shown in FIG. 2A, and the memory region may be written to a persistent module 212 as shown in FIG. 2B.

Figure 3A:
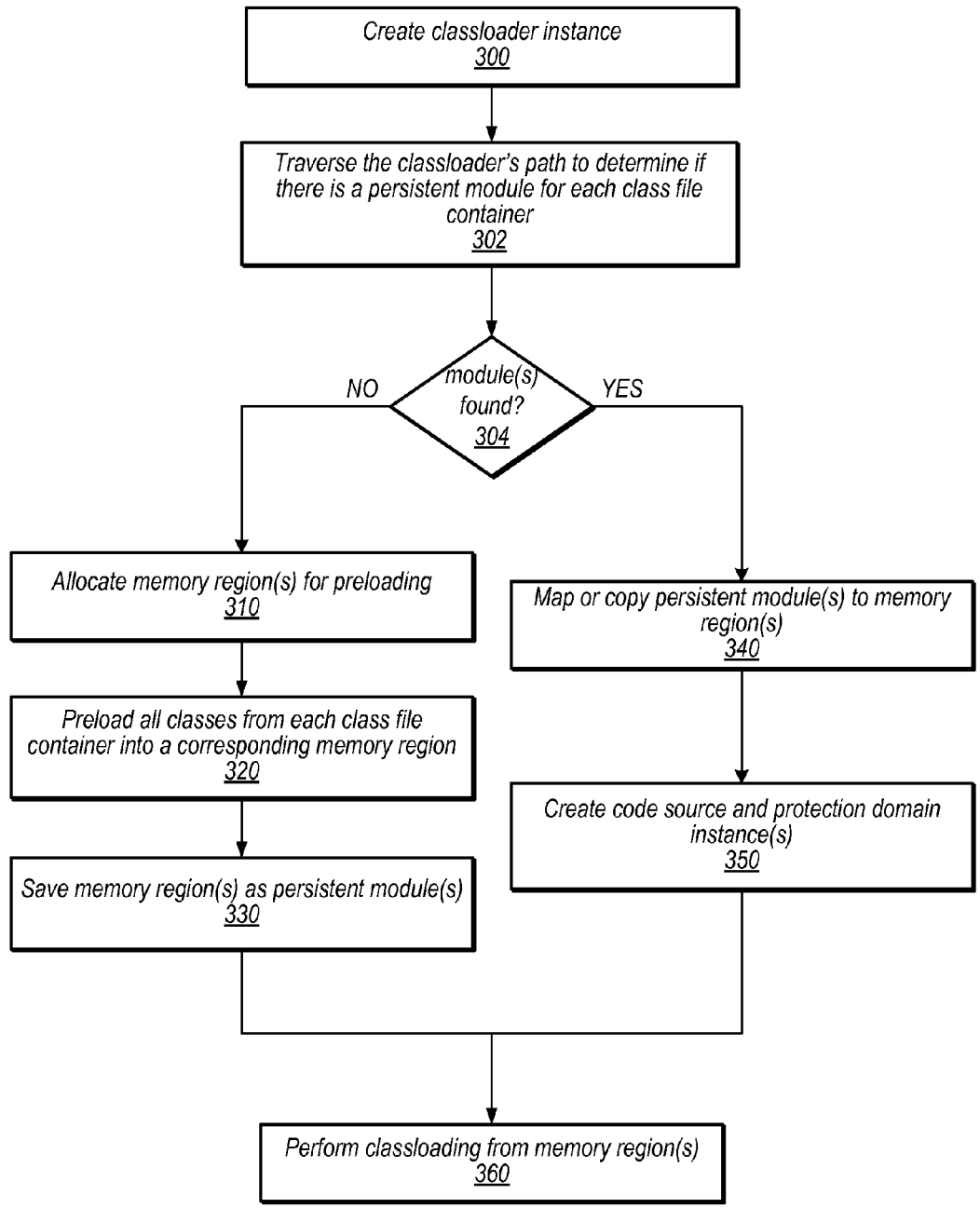
FIG. 3A is a high-level flowchart of the class preloading method, according to at least some embodiments.
Figure 3B:
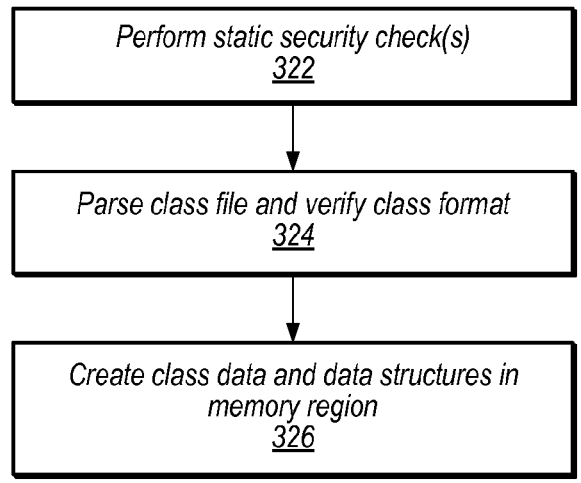
FIG. 3B is a flowchart showing details of a method for preloading classes from a class file container into a memory region, according to at least some embodiments.
Figure 3C:
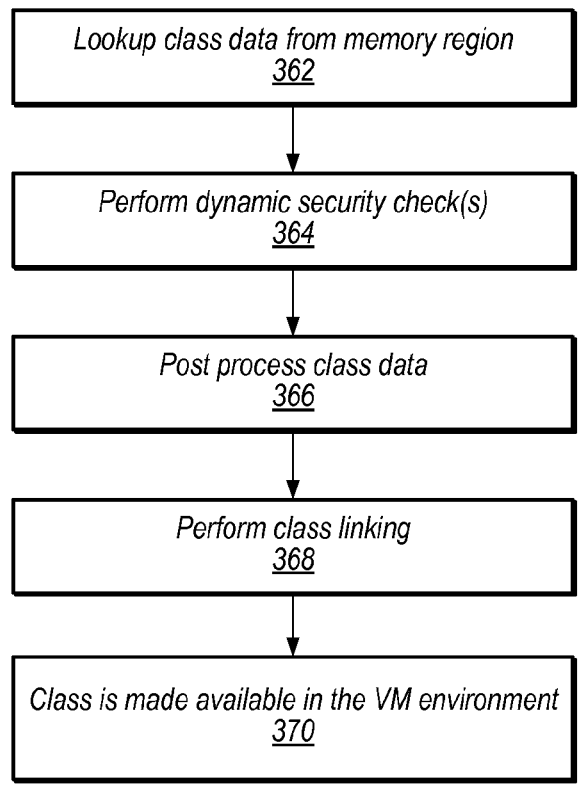
FIG. 3C is a flowchart showing details of a method for performing classloading from a memory region, according to at least some embodiments.

FIGS. 3A through 3C are flowcharts of a class preloading method that may be implemented by a class preloading mechanism in a virtual machine environment, according to at least some embodiments.

FIG. 3A is a high-level flowchart of the class preloading method, according to at least some embodiments. As indicated at 300, a classloader instance may be created. The classloader instance may be created during startup of an application instance or after startup and during runtime of the application instance. The classloader instance may be a system classloader instance, a middleware classloader instance, an application classloader instance, or in general an instance of any classloader instantiated at startup or during runtime of the application instance. The application instance may be instantiated in a virtual machine (VM) environment, for example a JVM environment.

As indicated at 302, during or after instantiation of the classloader instance, the class path of the classloader (for example, specified as a URL) may be traversed to determine, for each of one or more class file containers (e.g., JAR files) associated with the classloader, if there is a persistent module corresponding to the class file container.

At 304, for each class file container, if a corresponding persistent module for the class file container is not found, then a memory region (which may be, but is not necessarily, a contiguous block of memory) may be allocated for preloading the class file(s) from the class file container, as indicated at 310. As indicated at 320, all of the classes from the class file container may then be preloaded into the memory region. In preloading the classes into the memory region, runtime data structures for the classes may be created and static security checks may be performed, but the classes are not fully linked and resolved. Details of a method for preloading the classes from the class file container are shown in FIG. 3B. As indicated at 330, after the classes from the class file container have been preloaded into the memory region, the memory region may be copied into a persistent module to thus save the preloaded classes in the memory region. In at least some embodiments, the persistent module may be a memory mapped file, and may be locally stored on the same device as the virtual machine instance on which the application is executing or may be remotely stored on some other device or devices.

At 304, for each class file container, if a corresponding persistent module for the class file container is found, then the persistent module is copied or mapped into a memory region, as indicated at 340. In at least some embodiments, after the persistent module is copied or mapped into the memory region, code source and protection domain instances for the specific class path(s) may be created, as indicated at 350. Classes copied or mapped into the memory region from the persistent modules are not fully linked and resolved until the classes are actually loaded in response to requests for the classes during runtime.

After a memory region corresponding to each of the one or more class file containers associated with the classloader has been created either by preloading from a class file container or by copying or mapping from a persistent module, classloading may be performed from the memory region(s), as indicated at 360. FIG. 3C shows details of a method for performing classloading from a memory region, according to at least some embodiments.

FIG. 3B is a flowchart showing details of a method for preloading classes from a class file container (e.g., a JAR file) into a memory region, according to at least some embodiments, and expands on element 320 of FIG. 3A. As indicated at 322 of FIG. 3B, static security checks may be performed on the classes in the class file container. For example, class names and/or package names may be checked to determine if the names are in a valid format and include only valid characters. As indicated at 324, the class file(s) in the class file container may be parsed and the format of the class(es) in the class file(s) may be verified. As indicated at 326, runtime data structures and class data for the class(es) may be created in the corresponding memory region. Note that the memory region may be expanded if necessary.

FIG. 3C is a flowchart showing details of a method for performing classloading from a memory region, according to at least some embodiments, and expands on element 360 of FIG. 3A. After a memory region corresponding to each of the one or more class file containers associated with the classloader has been created either by preloading from a class file container or by copying or mapping from a persistent module, classes may be loaded by the classloader instance from the memory region in response to requests for the classes received by the classloader instance during runtime of the application. As indicated at 362, the classloader instance may perform a lookup operation to locate the class data in the memory region. As indicated at 364, the classloader instance may then perform dynamic (runtime) security checks on the class data. For example, security checks performed by a security manager may be performed. In at least some embodiments, static security checks performed during preloading are not repeated. As indicated at 366, after performing the dynamic security checks, any necessary post-processing of the class data may be performed. As indicated at 368, class linking may be performed. In at least some embodiments, this class linking may include, but is not limited to, locating super interfaces, linking the class to a superclass, generating a method table based partially on the superclass, and determining object layout based partially on the superclass. As indicated at 370, the class is made available in the VM environment for use by application(s). The application(s) can then use the fully loaded class. In at least some embodiments, in making the class available, the class may be added to the class table and the classloader's class vector.

Note that the classloader instance may first delegate loading of the class to a parent classloader and may thus only attempt to load the class from the memory region if delegation does not result in the class being loaded.

Dynamic Class Preloading Method and Mechanism Details

This section provides more details of the class preloading method and mechanism as illustrated in FIGS. 2A through 2D and FIGS. 3A through 3C, according to at least some embodiments. The class preloading method and mechanism may reduce the time it takes to load classes in an application by dynamically copying or mapping classes into memory regions from previously generated persistent modules, for example when a classloader is instantiated. The classes may be loaded from previously generated persistent modules if the persistent modules are found, or may be preloaded from class file containers and then stored in persistent module(s) if the persistent modules are not found. The classes are preloaded into the memory regions in a form that is not fully linked and resolved. A class is fully linked and resolved when and if the class is loaded from a memory region by the classloader instance.

Preloading from Class File Containers

In at least some embodiments, when creating a classloader instance (the classloader may, for example, be system classloader, middleware classloader, or application classloader), the virtual machine (VM) iterates the classloader's class path to determine if classes from specific class file containers (e.g., JAR files) in the class path have been preloaded. Note that, if the classes have been preloaded, then a persistent module corresponding to the class file container should exist. If the VM determines that the class file container is not yet preloaded (i.e., a persistent module for the class file container does not exist), the VM allocates a memory region (e.g., using mmap, malloc, or some other memory allocation technique). The VM may generate and maintain a record of information related to the memory region. The record may include one or more of, but is not limited to, the corresponding classloader instance, the class file container path, the memory region start and end addresses, and the allocation top within the memory region. The record for the memory region may, for example, be used to map the memory region to a persistent module corresponding to the memory region, and also serves to map the persistent module to the memory region. In at least some embodiments, the VM then attempts to load all classes from the class file container eagerly using the newly created classloader instance without delegating to its superclass classloader. In at least some embodiments, the superclass is not linked to the class(es) at this time. In at least some embodiments, the classloader instance may perform static security checks including one or more of, but not limited to, class name checks and package name checks, on the classes during preloading.

When the VM reads in a class file from a class file container during preloading, the VM processes the class file and creates data structures for the class within the corresponding memory region. The data structures may include, but are not limited to, class metadata, method metadata, field metadata and constant pools that the VM understands and can use directly. In at least some embodiments, the VM may allocate all class data consecutively out of the corresponding memory region for all classes from the same class file container. The VM keeps track of each memory region for each related classloader instance and class file container, and also maps the memory regions to corresponding persistent modules and vice versa. Thus, the VM can determine which memory regions to allocate memory from in cases where there are multiple classloader instances for which preloading is being performed.

In at least some embodiments, as part of the preloading process, the constant pool entries in a preloaded class file may be processed and type identifiers (type IDs) may be created for entries such as CONSTANT_Class, CONSTANT_Fieldref, CONSTANT_Methodref, and CONSTANT_InterfaceMethodref, or the like. In at least some embodiments, a type ID may be a token, for example a 32-bit token, which is easier to compare and store than the raw names and types. In at least some embodiments, StackMapTable/StackMap attributes may be read in from the class file container (e.g., JAR file) and saved to the allocated portion of the memory region along with the rest of the preloaded class data.

In at least some embodiments, linking, resolution, and verification (other than static security checks and verification of class format as shown in FIG. 3B) are not performed on the preloaded classes. In at least some embodiments, a preloaded class is not added to the class table nor to the classloader's vector (which tracks all classes loaded by this classloader). Therefore, a preloaded class is not made visible to the rest of the system and is not usable by applications within the VM environment at this point.

Once all the classes from a class file container are preloaded into a memory region, the preloaded class metadata may then be stored to a persistent module, which may, for example, be a file or shared memory. This may be performed by writing the memory region allocated for preloading the class file container to persistent storage as a persistent module. All preloaded classes from a class file container are stored to the same persistent module. The persistent module corresponds to the preloaded class file container.

Loading from Persistent Modules

In at least some embodiments, in subsequent launches, when creating an instance of a classloader for which the class file container(s) (e.g., JAR files) were preloaded on a previous launch, the VM may copy or map the saved class data from the persistent module(s) corresponding to the classloader's class file containers into a memory region in the process' address space. In at least some embodiments, copying or mapping from a persistent module may involve virtual memory mapping, i.e. mapping the file to virtual memory with paging into physical memory (e.g., random access memory (RAM)) deferred until the page is referenced, or alternatively may involve copying a portion or all of the content of the persistent module directly into physical memory (e.g., RAM). In at least some embodiments, the VM may also create code source and protection domain instances for the specific class path. The VM can thus perform fast classloading when a class is requested from the persistent module. The classloader instance checks to determine if the preloaded class is in the memory region. In at least some embodiments, if the class is in the memory region, the classloader instance may then check package access using a security manager (if installed). The classloader instance may perform other dynamic security checks that are defined by the specific classloader. However, the classloader instance may not perform static security checks (e.g., classname and package name checks) that were already performed when preloading the class from a class file container. The VM may then attempt to define the class using the preloaded class data. In at least some embodiments, defining the class using the preloaded class data may, for example, involve creating the class instance, associating the class instance with the current classloader, and creating code source and protection domain instances for the class. In at least some embodiments, defining the class using the preloaded class data may also involve creating String objects for constant pool CONSTANT_String entries, and processing StackMapTable/StackMap attributes. In at least some embodiments, the defined class may then be added to the class table and the classloader's vector.

In at least some embodiments, the classloader instance may also load and link the superclass for the class so that class instance is ready for the VM to use.

In at least some embodiments, when loading classes from persistent modules, the class metadata may be copied or mapped from the persistent module into memory. Classloading functions that were performed when preloading the classes from a class file container into a memory region from which the persistent module was created may not need to be performed. Thus, the VM may not need to do expensive tasks such as class path searching, reading of the class file from a class file container, converting the constant pool, creating type IDs, and so on. Thus, classloading of classes copied or mapped into the memory regions from persistent modules may be more efficient than classloading as performed by conventional classloading techniques.

In addition, since the preloaded class data in a memory region is not fully linked and resolved until a class is actually loaded from the memory region upon request at runtime, the VM may update a persistent module without affecting other classes in other persistent modules. In at least some embodiments, class unloading may also be supported for preloaded classes.

In at least some embodiments, a list of the classes in a persistent module may be stored with the persistent module. This list may also contain pointers to the classes in the persistent module. In at least some embodiments, instead of or as an alternative to loading all classes from the persistent modules, for example when a classloader is instantiated, the VM may only copy or map the class data for a class or classes from the persistent module(s) into memory of the VM on demand, e.g. in response to a request for the class. In at least some embodiments, the list of classes may be read into memory, and then used in loading class(es) from the persistent module when the class(es) are requested Global Type ID Database In a class file, strings (e.g., UTF8 strings) may be used to represent names and data types. When preloading classes from class file containers, type IDs may be created for names (e.g., class and method names) and corresponding data types that are typically represented as alphanumeric strings. In at least some embodiments, a type ID may be a token, for example a 32-bit token, that is easier to compare and store than the raw names and types.

However, when creating persistent modules for classloaders, it is possible to end up with overlapping type IDs that represent different type strings unless there is a method to track the type IDs across modules. A first persistent module may be created and its type IDs may be included in the module. When another persistent module is created, without knowledge of the type IDs of the first module, the same type ID may be created and stored with the persistent module. In addition, it is possible that two separate persistent modules may create different type IDs for the same type string. Thus, in at least some embodiments, a global table may be created that contains all type IDs for all persistent modules that have been created. When creating a new persistent module, this global table may be checked so that potential problems such as duplicate type IDs for different type strings and different type IDs for the same type string can be avoided.

In at least some embodiments, a global type ID database may be created and maintained for the preloaded class file containers for all classloaders. The global type ID database may be stored in separate memory from the rest of the class data. On startup, the VM may copy or map the global type ID database into memory before preloading or dynamically loading any classes. Any type IDs created during preloading may be added to the global type ID database. The global type ID database may be checked before creating a type ID to avoid duplication.

In at least some embodiments, the global type ID database may include pointers that point to addresses within the global type ID system. A persistent module may include pointers that point to data within the module and outside the module (e.g., into the global type ID database). The VM may copy or map the global type ID database and persistent modules into memory at the same address locations so that all the data can be used directly. On systems that cannot guarantee mapping at the same address, the VM may patch the pointers or use offsets to relocate the mapped data.

Optimizations

Some embodiments may include variations of the preloading method as described above that may further reduce the time it takes to load a class from the memory region during runtime. For example, in some embodiments, for class references that are build-time preloaded and/or that are known to not be replaceable at runtime, one or more preloaded classes in a persistent module may be linked to these classes when the persistent module is created. Thus, linking to these classes does not need to be performed when loading the class from the preloaded memory region when the class is requested at runtime, as a reference (e.g., an address) for data structures corresponding to these classes is included in the persistent module. As an example, in some embodiments, for classes with only java.lang.Object as a superclass, the VM may link the class with a data structure for the superclass (java.lang.Object) when preloading the class and storing the linking information in the persistent module. Thus, linking to the superclass does not need to be performed when loading the class from the preloaded memory region when the class is requested at runtime. As another example, in some embodiments, when preloading a class from the class file containers for a classloader, the VM (e.g., a JVM) may create the instance for the class and store data structures representing the instance along with other class data in the persistent module.

Implementation Details

In at least some embodiments, a preloader class may be instantiated as a preloader instance on the VM; a classloader instance may use the preloader instance to preload classes from class file container(s) (e.g., JAR files) in its class path at runtime. The preloader instance and classloader instance may have a one-to-one relationship. Each classloader instance may be assigned a unique preloader instance, and each preloader instance may be associated with one classloader instance. The preloader instance may include preloading state information and other information, for example a state field that indicates whether preloading is currently being performed and one or more fields indicating class instances or other data structures or fields that record memory region information, class file container path information, and other information that may be used by the preloader instance. The preloader instance may be created and registered with the classloader instance when the system creates the classloader instance.

The preloader instance may implement a method that takes an array of one or more class file container (e.g., JAR file) URLs and attempts to preload classes from each class file container indicated in the array. If a persistent module does not exist for a class file container, any necessary class instances or data structures may be initialized within the preloader instance, and an associated memory region may be created. The preloader instance may attempt to load all classes from a class file container using the associated classloader instance method(s) without delegating to the parent classloader. Superclass loading, resolving, linking and verification are not performed for the preloaded classes. The preloader instance allocates memory portions from the memory region associated with the class file container to create class data except for type IDs, which are allocated from a global ROM type ID database. If all classes from a class file container are successfully preloaded, the preloader instance saves the class data into the persistent module. The global ROM typeid database is saved separately.

If a persistent module already exists for a class file container, then the preloader instance maps the memory region at the address specified in the persistent module. When a class is requested, the memory region is searched looking for the given class name. If the class is found, the preloaded class is returned. The VM performs post-processing, which may include superclass loading, Java instance creation, resolving, linking and verifying. In at least some embodiments, the class is then added to the class table and is ready for use.

Alternative Implementations

Figure 4:
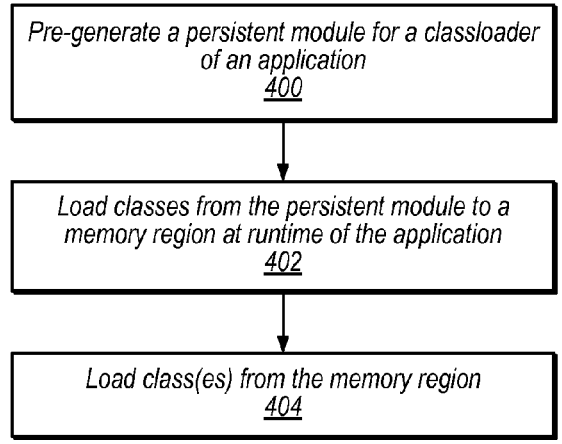
FIG. 4 illustrates pre-generating persistent modules for an application, according to at least some embodiments.

FIG. 4 illustrates pre-generating persistent modules for an application, according to at least some embodiments. In some embodiments, in addition or as an alternative to the above-described class preloading methods and mechanisms in which persistent modules are generated for class file containers at runtime of an application in a VM environment, at least some persistent modules for an application may be pre-generated. As indicated at 400, at least one persistent module may be pre-generated for an application. For example, an external application or utility may be provided that reads class file containers (e.g., JAR files) associated with classloaders and generates, as output, persistent modules as described above that correspond to the class file containers. The persistent module(s) for an application may, for example, be installed with the application on the device. As indicated at 402, classes from a pre-generated module may be loaded into a memory region at runtime of the application. For example, when a classloader is instantiated within the VM environment, the classloader may locate pre-generated persistent module(s) associated with its class paths and map or copy the content of the persistent module(s) into memory region(s) as specified in the persistent module(s). Note that memory addresses such as pointers may need to be appropriately mapped for the VM environment. As indicated at 404, the classloader may then load class(es) from the memory region in response to requests for the class(es).

By pre-generating persistent modules, when running an application within a VM environment, the application's classloaders may not need to open and read classes from class file containers even on an initial execution.

In some embodiments, if a pre-generated persistent module for a class file container is not found at runtime of the application, then the application may preload the classes from the class file container into a memory region and write the memory region to a persistent module, as previously described. Classes can then be loaded from the memory region in response to class requests.

Figure 5:
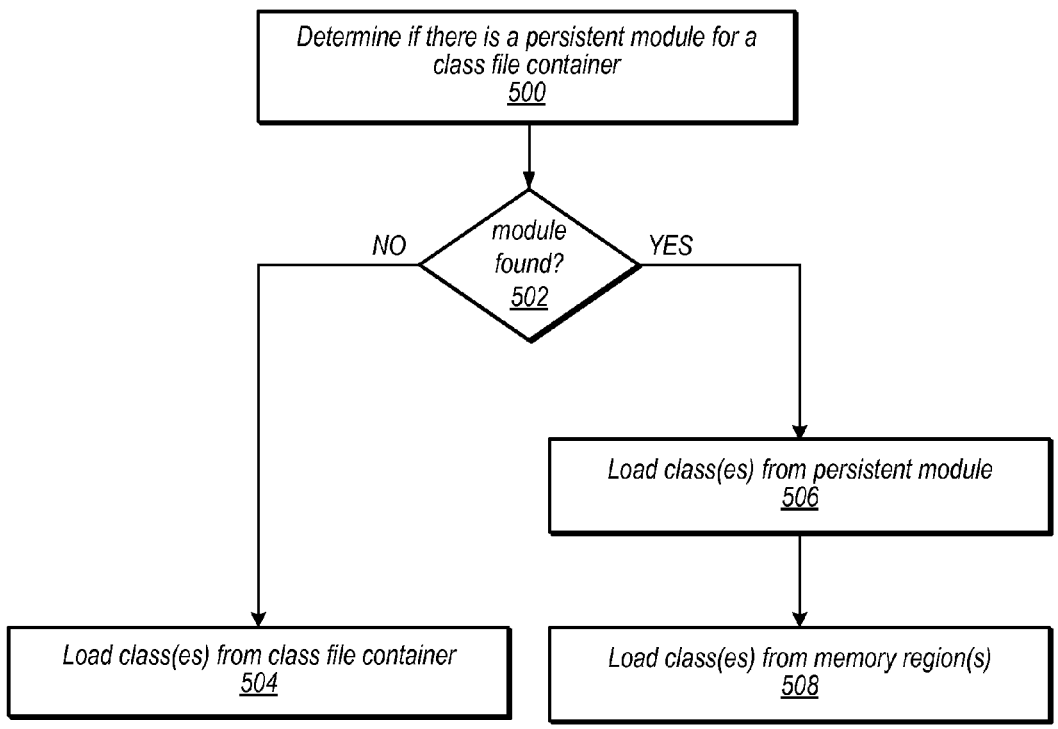
FIG. 5 illustrates loading classes from pre-generated persistent modules, or from a class file container if a persistent module is not found for the class file container, according to at least some embodiments.

FIG. 5 illustrates loading classes from pre-generated persistent modules, where classes are loaded from the class file container if a persistent module is not found for the class file container, according to at least some embodiments. In some embodiments, if a pre-generated persistent module for a class file container is not found at runtime of the application, instead of preloading the classes from the class file container into a memory region, writing the memory region to a persistent module, and loading classes from the memory region, the application may simply load classes from the class file container in response to class requests. As indicated at 500, at runtime of an application, e.g. during instantiation of a classloader, the application may attempt to locate a persistent module corresponding to the classloader's class file container. At 502, if a persistent module corresponding to the classloader's class file container is not found, the classes are not preloaded from the class file container. Classes are loaded directly from the class file container in response to class requests, as indicated at 504. At 502, if a persistent module for the classloader is found, then at 506 the class(es) may be loaded into a memory region by copying or mapping from the persistent module, as previously described. Classes can then be loaded from the memory region in response to class requests, as indicated at 506.

Embodiments have generally been described in which a classloader instance is instantiated, and at least some of the class preloading tasks are performed by the classloader. However, in some embodiments, object oriented creation of something resembling a classloader object may not be required. For example, in a non-object oriented environment, there may be a "class loading" component of the VM that creates separate data structures (e.g., C programming language data structures or the like) that track different class file containers and their mappings to persistent modules Example System Various components of methods and apparatus for dynamically preloading classes as described herein may be executed on one or more computer systems, which may interact with various other devices. One such computer system is illustrated by FIG. 6. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions, components, or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of graphical algorithms. For example, a graphics processor may implement a number of graphics primitive operations in a way that makes executing them much faster than drawing directly to the screen with a host central processing unit (CPU). The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for various embodiments of methods and apparatus for dynamically preloading classes, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 6, memory 1020 may include program instructions 1025, configured to implement embodiments of methods and apparatus for dynamically preloading classes, and data storage 1035, comprising various data accessible by program instructions 1025. In one embodiment, program instructions 1025 may include software elements of an embodiment of a method and apparatus for dynamically preloading classes, as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of methods and apparatus for dynamically preloading classes as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electro-magnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   loading at least one class indicated by a classloader at runtime of a virtual machine (VM) environment on a device, wherein said loading comprises, for at least one class file container indicated by the classloader, prior to the classloader receiving requests for classes defined by the class file container:
   locating a persistent module external to the virtual machine environment and corresponding to the class file container, wherein the persistent module contains one or more data structures representing classes defined by one or more class files in the respective class file container, wherein the one or more data structures were previously saved to the persistent module based on a previous preloading, prior to said loading, of the classes represented by the one or more class files; and
   mapping or copying content of the persistent module to memory within the VM environment to preload the one or more classes from the persistent module into the VM environment without loading the one or more classes from respective class files in the class file container, wherein the one or more preloaded classes are not fully linked or resolved in the VM environment prior to the classloader receiving requests for the one or more classes, and wherein the one or more preloaded classes that are not fully linked or resolved are not made available in the VM environment for use by applications until after the classloader receives the requests for the one or more classes.

2. The method as recited in claim 1, further comprising, prior to said loading the at least one class, generating one or more persistent modules each corresponding to a different one of one or more class file containers indicated by the classloader, wherein each persistent module contains one or more data structures representing classes defined by one or more class files in a respective class file container.

3. The method as recited in claim 2, wherein generating a persistent module corresponding to a given class file container indicated by the classloader comprises:
   preloading one or more classes from the given class file container into memory within the VM at runtime of the VM environment, wherein the one or more preloaded classes are not fully linked or resolved in the VM environment; and
   storing the preloaded classes as data structures representing the classes defined by the given class file container to generate a persistent module corresponding to the given class file container.

4. The method as recited in claim 3, further comprising allocating a memory region corresponding to the given class file container within the VM environment prior to said preloading the one or more classes from the given class file container into memory within the VM.

5. The method as recited in claim 3, wherein a separate memory region is allocated for each of the one or more class file containers indicated by the classloader.

6. The method as recited in claim 3, wherein said preloading the one or more classes from the given class file container into memory comprises, for each of the one or more classes, performing one or more static security checks on the class as defined in the given class file container.

7. The method as recited in claim 6, wherein the static security checks are not repeated in said mapping or copying content of the persistent module to memory within the VM environment to load the one or more classes from the persistent module into the VM environment.

8. The method as recited in claim 3, wherein said preloading the one or more classes from the given class file container into memory comprises, for each of the one or more classes, creating one or more data structures for the class in memory according to the definition of the class in the given class file container.

9. The method as recited in claim 3, wherein said preloading the one or more classes from the given class file container into memory comprises, for at least one of the one or more classes, linking the respective preloaded class to at least one other class, wherein at least one reference to the at least one other class is included in the persistent module.

10. The method as recited in claim 3, wherein said preloading the one or more classes from the given class file container into memory comprises:
    creating type IDs for names and corresponding data types related to the one or more classes, wherein a type ID is a token; and
    storing the type IDs to a global type ID database.

11. The method as recited in claim 2, wherein said generating a persistent module corresponding to at least one of the one or more class file containers indicated by the classloader is performed prior to runtime of the VM environment.

12. The method as recited in claim 1, wherein said loading the at least one class indicated by the classloader at runtime of the VM environment further comprises:
    attempting to locate a persistent module corresponding to another class file container; and
    in response to not locating a persistent module corresponding to the other class file container:
        preloading one or more classes from the other class file container into memory within the VM environment, wherein the one or more preloaded classes are not fully linked or resolved in the VM environment; and
        storing the preloaded classes from the other class file container as data structures representing the classes defined by the other class file container to generate a persistent module corresponding to the other class file container.

13. The method as recited in claim 1, wherein said loading the at least one class indicated by the classloader at runtime of the VM environment further comprises:
    attempting to locate a persistent module corresponding to another class file container; and
    in response to not locating a persistent module corresponding to the other class file container, the classloader loading one or more classes from the other class file container into the VM environment, wherein the one or more loaded classes are linked and resolved in the VM environment.

14. The method as recited in claim 1, further comprising instantiating the classloader as a classloader instance in the VM environment, wherein said loading the at least one class is performed during said instantiating the classloader.

15. The method as recited in claim 1, further comprising, subsequent to said loading the at least one class indicated by the classloader at runtime of the VM environment:
    receiving a request to load a class indicated by the classloader in the VM environment;
    loading the requested class from a preloaded class in memory of the VM environment, wherein said loading the requested class from the preloaded class comprises completing linking and resolution of the requested class in the VM environment; and
    making the requested class available within the VM environment.

16. The method as recited in claim 15, wherein said completing linking and resolution of the requested class in the VM environment comprises performing one or more dynamic security checks on the requested class.

17. A system comprising:
    at least one processor; and
    a memory storing program instructions, wherein the program instructions are executable by the at least one processor to load at least one class indicated by a classloader at runtime of a virtual machine (VM) environment;
    wherein to load the at least one class indicated by the classloader at runtime of the VM environment, the program instructions are executable by the at least one processor to, for each of one or more class file containers indicated by the classloader, prior to the classloader receiving requests for classes defined by the class file containers:
        attempt to locate a persistent module external to the virtual machine environment and corresponding to the class file container, wherein a persistent module contains one or more data structures representing classes defined by one or more class files in a class file container, wherein the one or more data structures were previously saved to the persistent module based on a previous preloading, prior to said loading, of the classes represented by the one or more class files;
        if a persistent module corresponding to the class file container is not located:

preload the one or more classes from respective class files in the class file container into memory within the VM environment, wherein the one or more preloaded classes are not fully linked or resolved in the VM environment; and store one or more data structures representing the preloaded classes to a persistent module corresponding to the class file container from which the one or more classes were preloaded;

if a persistent module corresponding to the class file container is located, mapping or copying content of the persistent module to memory within the VM environment to preload the one or more classes from the persistent module into the VM environment without loading the one or more classes from respective class files in the class file container, wherein the one or more preloaded classes are not fully linked or resolved in the VM environment prior to the classloader receiving requests for the one or more classes, and wherein the one or more preloaded classes that are not fully linked or resolved are not made available in the VM environment for use by applications until after the classloader receives the requests for the one or more classes.

18. The system as recited in claim 17, wherein, subsequent to said loading the at least one class indicated by the classloader at runtime of the VM environment, the program instructions are further executable by the at least one processor to:

receive a request to load a class in the VM environment;

locate a preloaded class corresponding to the requested class in memory of the VM environment; and load the requested class from the preloaded class in memory of the VM environment, wherein linking and resolution of the requested class in the VM environment are completed during said loading the requested class from the preloaded class.

19. A non-transitory computer-readable storage medium storing program instructions, wherein the program instructions are computer-executable to implement:

generating one or more persistent modules each corresponding to a different one of one or more class file containers indicated by a classloader, wherein each persistent module contains one or more data structures representing classes defined by one or more class files in a respective class file container, wherein the one or more data structures are saved to the persistent module based on preloading the classes represented by the one or more class files; and loading at least one class indicated by the classloader at runtime of a virtual machine (VM) on a device, wherein, in said loading, the program instructions are computer-executable to implement, for at least one class file container indicated by the classloader, prior to the classloader receiving requests for classes defined by the class file container:

locating a persistent module external to the virtual machine environment and corresponding to the class file container, wherein the persistent module contains one or more data structures representing classes defined by one or more class files in the respective class file container, wherein the one or more data structures were previously saved to the persistent module based on a previous preloading, prior to said loading, of the classes represented by the one or more class files; and mapping or copying content of the persistent module to memory within the VM environment to preload the one or more classes from respective class files in the persistent module into the VM environment without loading the one or more classes from the class file container, wherein the one or more preloaded classes are not fully linked or resolved in the VM environment prior to the classloader receiving requests for the one or more classes, and wherein the one or more preloaded classes that are not fully linked or resolved are not made available in the VM environment for use by applications until after the classloader receives the requests for the one or more classes.

20. The non-transitory computer-readable storage medium as recited in claim 19, wherein, in generating a persistent module corresponding to a given class file container indicated by the classloader, the program instructions are computer-executable to implement:

preloading one or more classes from the given class file container into memory within the VM at runtime of the VM environment, wherein the one or more preloaded classes are not fully linked or resolved in the VM environment; and storing the preloaded classes as data structures representing the classes defined by the given class file container to generate a persistent module corresponding to the given class file container.

* * * * *

UNITED STATES PATENT AND TRADEMARK OFFICE
CERTIFICATE OF CORRECTION

PATENT NO. : 9,507,613 B2  
APPLICATION NO. : 13/436476  
DATED : November 29, 2016  
INVENTOR(S) : Zhou et al.

Page 1 of 1

It is certified that error appears in the above-identified patent and that said Letters Patent is hereby corrected as shown below:

In the Specification

In Column 12, Line 46, after "requested" insert -- . --.

In Column 15, Line 38, after "modules" insert -- . --.

Signed and Sealed this
Twentieth Day of June, 2017

Joseph Matal
*Performing the Functions and Duties of the
Under Secretary of Commerce for Intellectual Property and
Director of the United States Patent and Trademark Office*